United States Patent [19]
Kanao

[11] Patent Number: 5,191,916
[45] Date of Patent: Mar. 9, 1993

[54] PRESSURE-RESISTANT HELICAL CORRUGATED PIPE

[76] Inventor: Shiro Kanao, No. 9-18, Nanpeidai 4-chome, Takatsuki-shi, Osaka, Japan

[21] Appl. No.: 440,170

[22] Filed: Nov. 22, 1989

[30] Foreign Application Priority Data

Nov. 26, 1988 [JP] Japan ................................ 299336

[51] Int. Cl.$^5$ .......................... F16L 9/16; F16L 9/06
[52] U.S. Cl. .................................... 138/173; 138/121; 138/122; 138/133; 138/134; 138/153
[58] Field of Search ............... 138/121, 122, 129, 150, 138/174, 154, 173, 153, 133, 134, 135, 136

[56] References Cited

U.S. PATENT DOCUMENTS

| | | | |
|---|---|---|---|
| 1,478,185 | 12/1923 | Sundh | 138/134 |
| 1,746,701 | 2/1930 | Kimmich | 138/133 |
| 3,198,873 | 8/1965 | Ryan et al. | 138/133 |
| 4,337,800 | 7/1982 | Carlson et al. | 138/135 |
| 4,838,317 | 6/1989 | Andre et al. | 138/134 |
| 4,860,797 | 8/1989 | Richards et al. | 138/154 |
| 4,862,924 | 9/1989 | Kanao | 138/129 |
| 4,976,289 | 12/1990 | Umemori et al. | 138/122 |

FOREIGN PATENT DOCUMENTS 473535 10/1937 United Kingdom ............... 138/135

Primary Examiner—James E. Bryant, III
Attorney, Agent, or Firm—Sughrue, Mion, Zinn, Macpeak & Seas

[57] ABSTRACT

A pressure-resistant helical corrugated pipe comprises a helical corrugated pipe wall having a top portion, opposite side wall portions extending from the top portion and a bottom portion extending from the side wall portions and disposed closed to the axis of the pipe; and belt plates which are formed separately from each other and made of a thin metal. The belt plates are disposed respectively at the side of the top portion and the side of the bottom portion as constituent elements for the pipe wall. The opposite edges of the two metal belt plates are disposed in abutted relation or in spaced opposed relation at the opposite side wall portions. The two metal belt plates are interconnected by connective portions which are made of a synthetic resin or rubber.

6 Claims, 5 Drawing Sheets

PRESSURE-RESISTANT HELICAL CORRUGATED PIPE

BACKGROUND OF THE INVENTION

The present invention relates to a pressure-resistant helical corrugated pipe adapted to be buried in the ground, so that telecommunication cables such as an electric cable and a telephone cable can be installed in such corrugated pipe for the purpose of protecting such cables. Also, such a corrugated pipe is used as a water main pipe, a sewer pipe, or a liquid transport pipe used in a plant or a factory.

Among such conventional pressure-resistant helical corrugated pipes, the pipes adapted for underground use have been required to be pressure-resistant in order to withstand a great ground pressure. An underground pressure-resistant pipe as shown in FIGS. 16 and 17 is conventionally known (see, for example, Japanese Laid-Open Utility Model Application No. 141889/86 filed by the Applicant of the present application). In this conventional pressure-resistant pipe, a continuous reinforcing belt plate 06 made of a thin metal plate is embedded in a pipe wall 01 and extends over a top portion 02 of the helical corrugation, opposite side wall portions 03 and 04 extending from the top portion 02, and part of a bottom portion 05.

However, since the metal reinforcing belt plate 06 to be thus embedded in the pipe wall 01 is of such a unitary construction that this plate is disposed in the top portion 02 and the opposite side wall portions 03and 04, with its oppositely-projecting side edge portions disposed in part of the bottom portion 05 as described above, the thin metal plate, when helically wound, is liable to be subjected to deformation due to strain because of variations in diameter of the thus helically-wound thin metal plate. This results in a problem that it is difficult to produce a helical pipe having a good appearance, and for this reason it has been necessary for the thin metal plate to be subjected to a special processing or working.

SUMMARY OF THE INVENTION

Therefore, an object of the present invention is to provide a pipe overcoming the problems encountered with the conventional pipe, in which belt plates each made of a thin metal plate are embedded in a pipe wall completely or generally over the entire periphery of the pipe wall in such a manner that the belt plates are not disposed in overlapping relation to each other, and in some cases, the metal belt plates are exposed at the surface of the pipe wall. The pipe can be easily manufactured, and can have a good appearance. The amount of a covering resin material can be reduced as compared with the amount used in the conventional pipe so that the overall weight of the pipe is reduced, and the pipe is excellent in pressure-resistance.

According to the present invention, there is provided a pressure-resistant helical corrugated pipe having a helical corrugated pipe wall formed by a top portion, opposite side wall portions extending from the top portion and a bottom portion extending from said side wall portions and disposed close to the axis of the pipe, wherein belt plates formed separately from each other and made of a thin metal plate are disposed respectively at the side of the top portion and at the side of the bottom portion as constituent elements for the pipe wall, the opposite side edges of the two metal belt plates are disposed in abutted relation or in spaced opposed relation at the opposite side wall portions, and the opposite side edge portions of the two metal belt plates are interconnected by connective portions which are made of a synthetic resin or rubber.

When the pipe of this construction is, for example, to be buried in the ground, a groove is dug in the ground at a required depth at the installation site, and the pipe is installed along the groove. When this pipe is used as a protective pipe for a cable, an electric cable or a telephone cable is passed through the pipe using a leading wire, and then the dug soil is applied to the pipe to cover it. In the case of such a cable-protective pipe, preferably, the pipe is not provided with the inner pipe wall, so that the pipe offers a less contact resistance when the cable is installed in the pipe. In the case where the pipe is used as a water mains pipe or a sewer pipe, preferably the pipe is provided with the inner pipe wall, so that a less water flow resistance is encountered.

BRIEF DESCRIPTION OF THE DRAWINGS

FIGS. 1 to 3 are illustrative of a first embodiment of the present invention, in which FIG. 1 is a partly-broken, front-elevational view of a pipe, FIG. 2 is a longitudinal cross-sectional view of a main portion of the pipe, and FIG. 3 is an exploded, cross-sectional view of the main portion;

DETAILED DESCRIPTION OF THE INVENTION

Preferred embodiments of the present invention will now be described with reference to the drawings.

Figure 1:
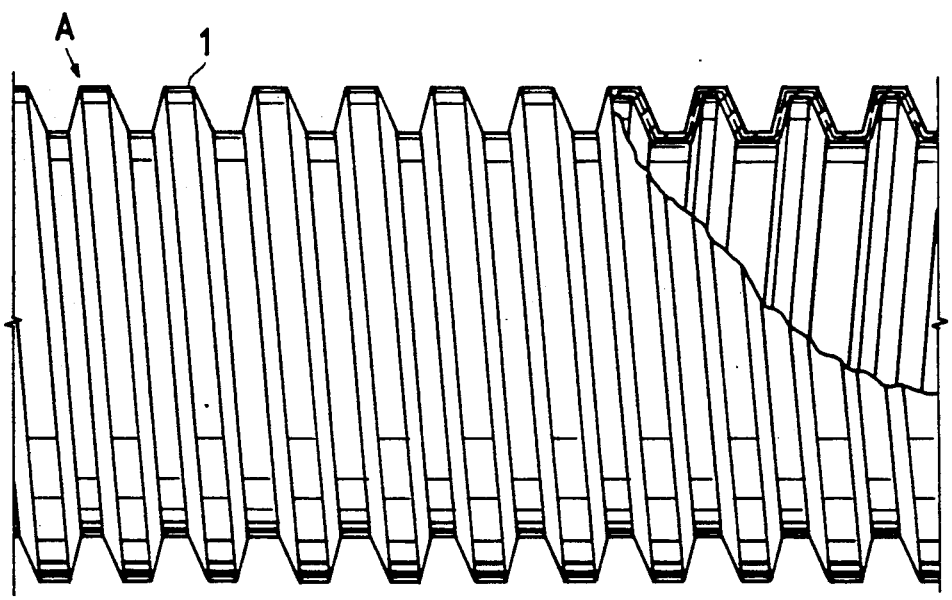
Figure 2:
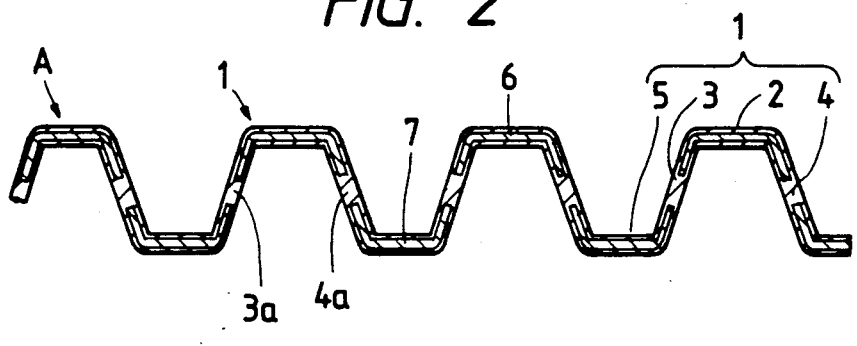
Figure 3:
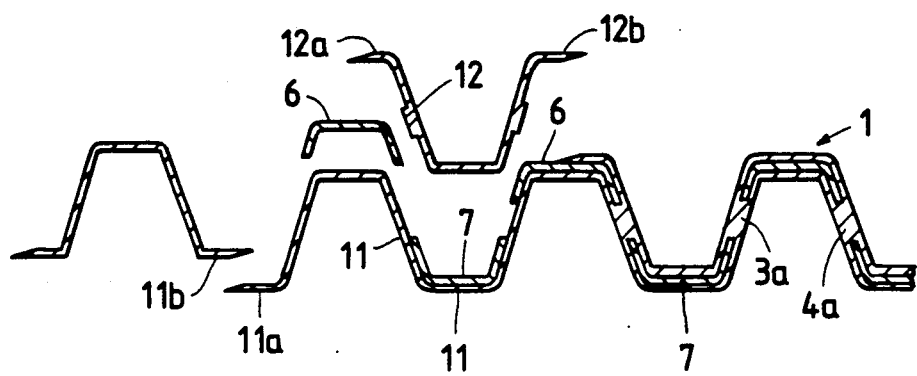

FIGS. 1 to 3 show one preferred embodiment of the invention (hereinafter referred to as "first embodiment"). A helical corrugated pipe A shown in FIG. 1 includes two kinds of belt plates 6 and 7 each made of a steel plate. As best shown in FIG. 3, the belt plate 6 has a downwardly-opening trapezoidal cross-section having a relatively small depth, and the belt plate 7 has a cross-section inverse to the cross-section of the belt plate 6, that is, an upwardly-opening trapezoidal cross-section having a relatively small depth. As shown in FIG. 2, the two belt plates 6 and 7 are so arranged as to be disposed at the side of a top portion 2 of a pipe wall 1 and at the side of a bottom portion 5, respectively, and the two belt plates 6 and 7 are sandwiched between synthetic resin materials so that the entire inner and outer peripheral surfaces of the two metal belt plates are covered with these synthetic resin materials. These synthetic resin materials are fused to be integrally joined to the two belt plates 6 and 7. Thus, the upper and lower metal belt plates 6 and 7 are disposed or embedded in the synthetic resin material constituting the pipe wall 1.

For forming the helical corrugated pipe A of this embodiment, as shown in FIG. 3, a belt member 11 of a synthetic resin, which has a generally downwardly-opening trapezoidal cross-section having lower end or edge portions (projections) 11a and 11b directed laterally horizontally away from each other, is gradually wound helically with its opposite horizontal projections 11a and 11b overlapping each other, and the thus overlapped projections 11a and 11b are fused together to form an inner resin wall portion of the pipe wall 1. Then, the two kinds of steel belt plates 6 and 7 are helically wound on this inner resin wall portion in such a manner that the plates 6 and 7 are arranged at the top portion side and the bottom portion side, respectively. Another belt member 12 of a synthetic resin, which is inverse in cross-section to the belt member 11 and hence has a generally trapezoidal cross-section, is helically wound on the two metal belt plates 6 and 7 on the inner resin wall portion in such a manner that its opposite horizontal projections 12a and 12b overlap each other. The thus overlapped horizontal projections 12a and 12b are fused together integrally to form an outer resin wall portion of the pipe wall 1. Thus, the belt members 11 and 12 are fusingly joined to the metal belt plates 6 and 7, so that the metal belt plates 6 and 7 are disposed integrally in the fusingly joined belt members 11 and 12, thereby providing the helical corrugated construction shown in FIG. 2.

In this embodiment, connective portions 3a and 4a made solely of the synthetic resin are provided respectively at generally central portions of opposite side wall portions 3 and 4 of the pipe wall 1. The metal belt plates 6 and 7 are absent in the connective portions 3a and 4a.

Figure 4:
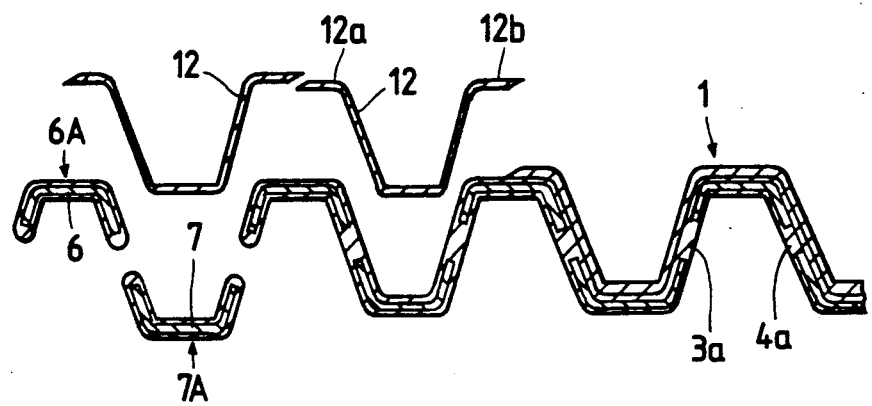
FIG. 4 is an exploded, cross-sectional view of a main portion of another embodiment.

FIG. 4 shows another method of producing a helical corrugated pipe similar in construction to the helical corrugated pipe A of the first embodiment shown in FIGS. 1 and 2. In this embodiment, two kinds of stainless steel belt plates 6 and 7, which respectively have downwardly-opening and upwardly-opening trapezoidal cross-sections as described above in the first embodiment, are passed through a synthetic resin extruder (not shown), so that the synthetic resin is fused onto the belt plate 6, 7 over the entire inner and outer peripheral surfaces thereof to form a molded belt member 6A, 7A. The belt member 7A of an upwardly-opening cross-section is precedingly wound helically, and subsequently the belt member 6A of a downwardly-opening cross-section is disposed above the belt member 7A and is helically wound in such a manner that the opposite lower ends or side edges of the belt member 6A abut respectively against the upper ends of the adjacent turns of the precedingly-wound belt member 7A. The thus abutted ends formed of the molded resin are fused to be joined together to form connective portions 3a and 4a. In this manner, the continuous helical pipe is formed step by step. Further, a synthetic resin belt member 12, which is similar to that shown in FIG. 3 and has a generally upwardly-opening, inverted trapezoidal cross-section, is helically wound on the outer periphery of the wall constituted by the belt members 6A and 7A, with its opposite side portions or projections fused together, and also the belt member 12 is fusingly joined integrally to the molded resin of the belt members 6A and 7A.

In this embodiment, the synthetic resin is beforehand fused to and integrally formed with each of the metal belt plates 6 and 7 over the entire inner and outer surfaces thereof. Thus, each metal belt plate is embedded in the synthetic resin material from the beginning, and the connective portions 3a and 4a made solely of the synthetic resin interconnect the opposed ends or edges of the belt plates 6 and 7 to form the helical pipe, as shown in FIG. 2. The metal belt plates 6 and 7 are not present in the connective portions 3a and 4a.

In this embodiment, although the belt members to be first wound are the resin molded belt members 6A and 7A having the synthetic resin applied integrally over the entire inner and outer peripheral surfaces of the metal belt members 6 and 7, the pipe wall may be formed by first winding the inner belt member 11, made solely of a synthetic resin, to form the inner resin wall portion of the pipe wall as in the first embodiment and then by winding the molded belt members 6A and 7A around this inner resin wall portion and fusing them to be integrally joined together. Further, an outer layer or wall of a synthetic resin may be formed on the outer periphery of such a construction to cover the same. Although not shown in the drawings, connective-purpose belt or extension portions made solely of the synthetic resin may be formed respectively on the lower ends or edges of the upper resin molded belt member 6A of a downwardly-opening cross-section, in which case these extension portions are fused to be integrally joined to the outer surface of the lower resin molded belt member 7A of an upwardly-opening cross-section, thereby interconnecting the two molded belt members 6A and 7A.

The metal belt plates 6 and 7 are not limited to a flat plate, and they can be made by a so-called perforated metal plate having a number of small perforations or punched holes formed therethrough. When synthetic resin layers are applied to such a metal plate having a number of small perforations, the synthetic resin layers on the opposite sides of the perforated metal plate flow through the perforations and are integrally joined together, so that the metal belt plate is firmly joined to the inner and outer resin layers. However, as described above in the above embodiments, the metal belt plates 6 and 7 used in the present invention are not necessarily limited to such a plate having the small perforations.

A method of manufacturing the resin molded belt members 6A and 7A is not limited to the above-mentioned method in which the synthetic resin is extruded from the die together with the metal belt plate 6, 7 to cover the same. For example, there can be used a covering method in which the metal belt plate 6, 7 is dipped in a molten resin, and also other coating and resin-application methods can be used.

In the helical corrugated pipes of the above embodiments, the pipe wall 1 is not provided with an inner pipe wall and therefore the inner peripheral surface of the pipe has a corrugated configuration. Such a pipe which is a so-called single-wall type helical pipe is used mainly as a cable-protective pipe into which a cable such as an electric cable and a telephone cable is inserted. In this case, the cable, when inserted into the pipe, comes into contact only with the corrugation of the inner peripheral surface of the pipe, and therefore the cable can be inserted into the pipe with a less frictional resistance.

Next, pipes of other embodiments having an inner pipe wall will now be described.

Figure 5:
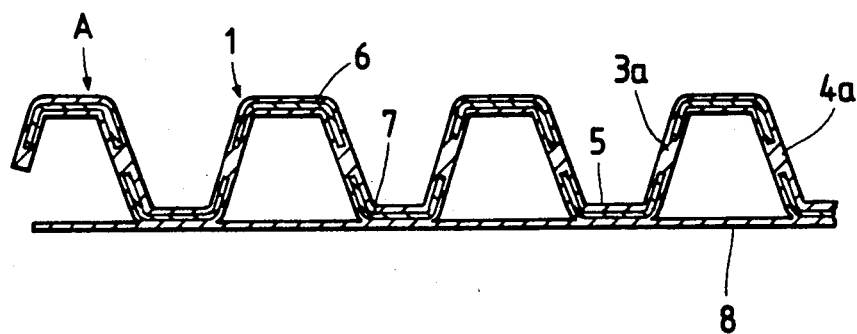
FIGS. 5 and 6 are a longitudinal cross-sectional view and an exploded, cross-sectional view of a main portion of a further embodiment, respectively.
Figure 6:
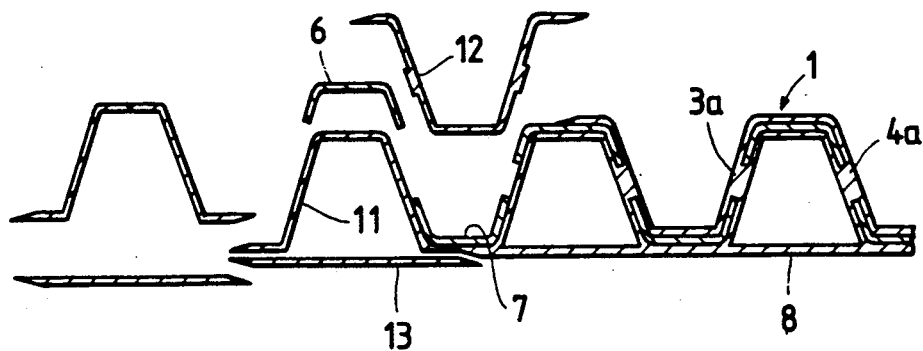

An embodiment shown in FIGS. 5 and 6 relates to a helical corrugated pipe A in which metal belt plates 6 and 7, respectively having a downwardly-opening trapezoidal cross-section and an upwardly-opening trapezoidal cross-section, are embedded in a pipe wall 1 as described above in the preceding embodiments, and in which an inner pipe wall 8 of a cylindrical shape is provided in the pipe wall. As shown in FIG. 6, a synthetic resin belt member 11 of a trapezoidal cross-section for forming an inner resin wall portion or layer of the pipe wall has a raised central portion and lower end or edge portions projecting laterally outwardly away from each other. Another synthetic resin belt member 12 for forming an outer resin layer of the pipe wall has a cross-section generally similar to but inverse to that of the belt member 11, that is, an inverted trapezoidal cross-section having a central portion recessed downwardly. The metal belt plates 6 and 7 are sandwiched between the two belt members 11 and 12 to form the helical corrugated pipe wall 1. A flat belt member 13 for forming the inner pipe wall 8 is applied to the inner peripheral surface of the helical corrugated pipe wall 1 in such a manner that the belt member 13 is integrally joined by fusion to a bottom portion 5 of the pipe wall 1.

The pipe having the inner pipe wall 8 provided in the helical corrugated pipe wall 1 is mainly used as a water main pipe, a sewer pipe, a pipe for transporting various chemicals or the like in a plant, and a pipe for the airborne transport of particles such as grain. In this case, because of the provision of the inner pipe wall 8, the flowing fluid in the pipe undergoes a less resistance, and therefore the fluid can be transported smoothly.

Next, modifications of the helical corrugated pipe wall 1 and the metal belt plates 6 and 7 will now be described.

Figure 7:
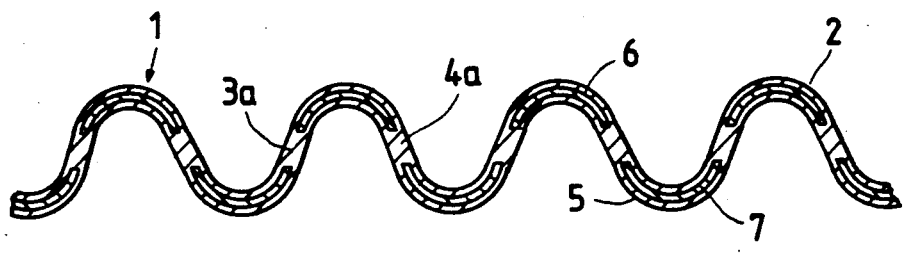
FIGS. 7 to 15 are longitudinal cross-sectional views of main portions of further embodiments, respectively.

In the above embodiments, although the corrugation of the pipe wall 1 as well as the belt plates 6 and 7 has a trapezoidal cross-section, the metal belt plates 6 and 7 may have, for example, an arcuate cross-section as shown in FIG. 7, in which case the pipe wall 1 has an arcuate corrugated cross section so as to match the shape of the metal belt plates 6 and 7. Also, for example, a channel-shaped corrugated cross-section or a triangular corrugated cross-section may be employed.

Figure 8:
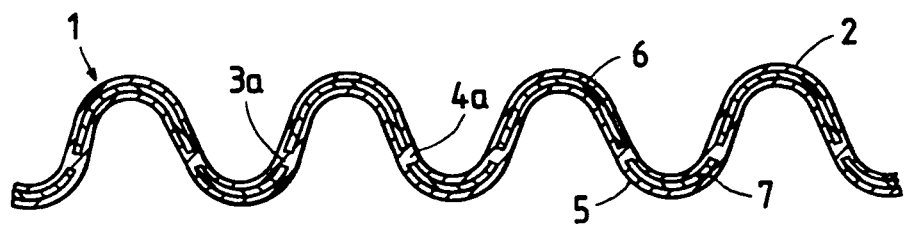
Figure 9:
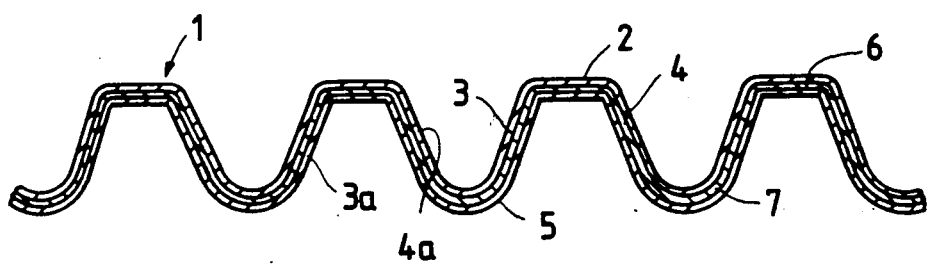

The metal belt plates 6 and 7 are not always required to have the same size, the same shape and the same thickness. The thickness of the resin constituting the pipe wall 1 does not always need to be uniform over the entire region thereof. Specifically, for example, as shown in FIG. 8, one belt plate 6 may have a greater width whereas the other belt plate 7 may have a smaller width. Also, as shown in FIG. 9, one belt plate 6 may be of a trapezoidal shape whereas the other belt plate 7 may be of a different shape such as an arcuate shape. In FIG. 9, the metal belt plates 6 and 7 are embedded in the pipe wall 1 in such a manner that the opposite side edges of metal belt plate 6 are almost abutted against the opposite side edges of the metal belt plate 7, respectively, at the respective connective portions 3a and 4a of the side wall portions 3 and 4 of the pipe wall 1.

Figure 10:
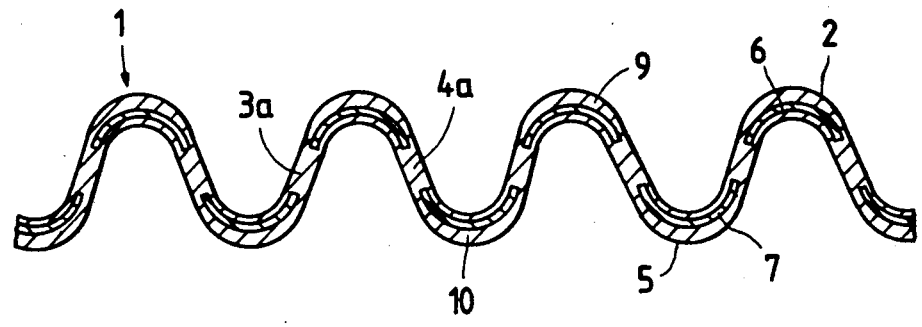

In an embodiment of the invention shown in FIG. 10, a pipe has a pipe wall 1 having a uniform thickness over the entire region thereof. Metal belt plates 6 and 7 are embedded in the pipe wall 1 in such a manner that the metal belt plate 6 is offset in the direction of the thickness of the pipe wall 1 toward one side of the pipe wall 1 whereas the metal belt plate 7 is offset in the direction of the thickness of the pipe wall 1 toward the other side of the pipe wall 1. With this arrangement, a thickened resin portion 9 is provided at the outer section of a top portion 2 of the pipe wall, and a thickened resin portion 10 is provided at the inner section of a bottom portion 5 of the pipe wall 1.

However, the thickened resin portions 9 and 10 do not always need to be provided over the entire widths of the top and bottom portions 2 and 5, respectively, and may be partially provided.

In the case where such thickened resin portion is provided at the inner side of the bottom portion 5, even when wear develops due to the frictional contact of a cable or the like, the wear does not reach the metal belt plate 7, so that the metal belt plate 7 will not become bare, thus positively preventing this metal belt plate from being subjected to rust. In the case where such thickened resin portion is thus provided at the outer side of the top portion, even when the pipe is dragged at the time of installation thereof, and is brought into contact with a sharp corner of a stone or a rock so that the pipe is damaged, the metal belt plate 6, advantageously, will not be exposed immediately.

Figure 11:
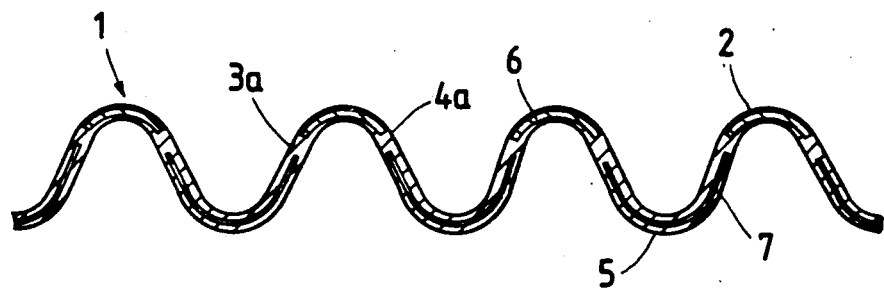

In an embodiment of the invention shown in FIG. 11, one belt plate 6 is formed using a metal belt material having a greater thickness than that of the other metal belt plate 7. Thus, the metal belt plates 6 and 7 may be made respectively of the materials having different thicknesses. Also, the two metal belt plates may be made of different materials. For example, one may be made of steel, and the other may be made of iron.

In the above embodiments, the pipes include the metal belt plates 6 and 7 which are covered with the covering or coating materials of a synthetic resin or the like over the entire inner and outer peripheral surfaces thereof. In other words, the pipes are of such a construction that the metal belt plates 6 and 7 are embedded in the pipe wall forming material of a synthetic resin or the like. However, in the present invention, the metal belt plates 6 and 7 are not always required to be covered with a synthetic resin or the like over the entire peripheral surfaces thereof. In the case where the metal belt plates 6 and 7 are made of a rust resistant material or a material which has been subjected to a rust-prevention treatment such as plating, electrophoretic deposition, metallic coating and resin baking finish, the pipe can be of such a construction that the metal belt plates 6 and 7 are partially exposed at the surface of the pipe wall, as in those embodiments mentioned below.

Figure 12:
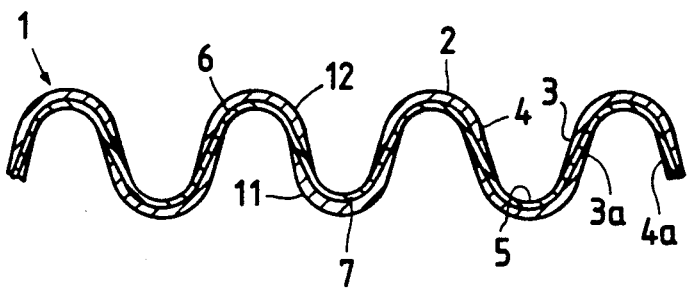

In an embodiment of the invention shown in FIG. 12, two kinds of metal belt plates 6 and 7 are arranged in such a manner that the opposite side edges of the belt plate 6 abut respectively against the opposite side edges of the belt plate 7 at opposite side wall portions 3 and 4 of a pipe wall 1. The outer surface of a top portion 2 of the pipe wall 1 and the inner surface of a bottom portion 5 are covered with resin materials 12 and 11, respectively, in such a manner that the resin materials 11 and 12 also cover the opposite sides of the belt plates 6 and 7 at connective portions 3a and 4 interconnecting there two belt plates. Thus, the inner side of the top portion 2 is exposed at the inner surface of the pipe wall 1, and the outer side of the bottom portion 5 is exposed at the outer surface of the pipe wall 1.

Figure 13:
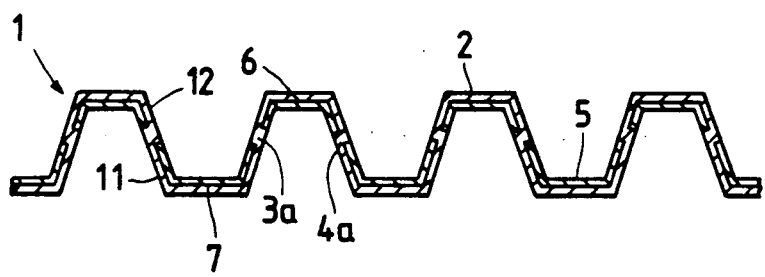

In an embodiment of the invention shown in FIG. 13, two kinds of metal belt plates 6 and 7 are arranged in such a manner that the opposite side edges of the belt plate 6 are disposed in spaced opposed relation to the opposite side edges of the belt plate 7, respectively, at opposite side wall portions 3 and 4 of a pipe wall 1. The other features of the construction are similar to those of the embodiment of FIG. 12.

Figure 14:
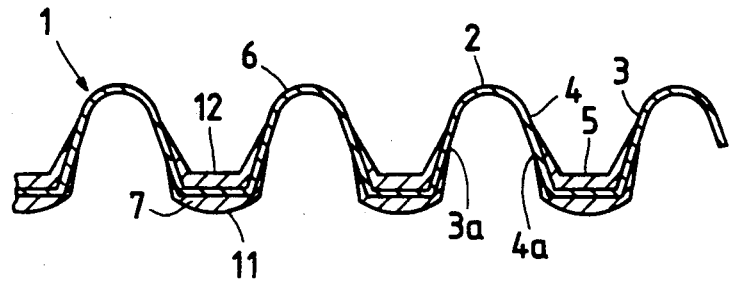

In an embodiment of the invention shown in FIG. 14, inner and outer surfaces of one metal belt plate 7, which is disposed at the side of a bottom portion 5 of a pipe wall 1, are covered with resin materials 11 and 12, respectively. The resin materials 11 and 12 also cover the opposite side edge portions of the other metal belt plate 6 at connective portions 3a and 4a interconnecting the two belt plates 6 and 7. The metal plate 6 disposed at the side of a top portion 2 of the pipe wall 1 remains bare at its inner and outer surfaces except for its opposite side edge portions covered respectively by the connective portions 3a and 4a.

Figure 15:
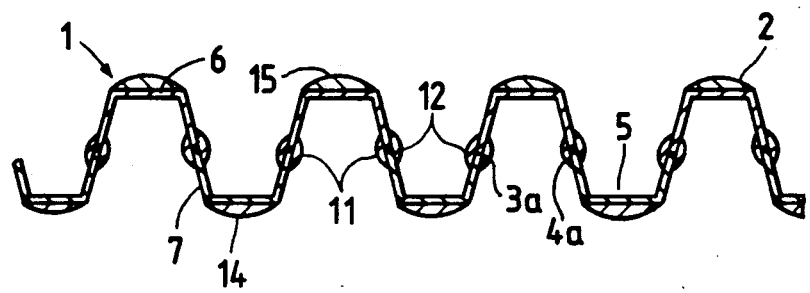
Figure 16:
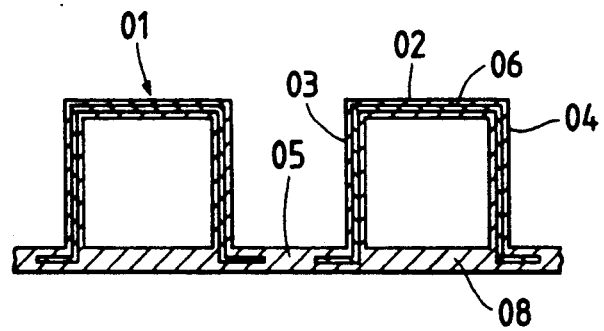
FIGS. 16 and 17 are a longitudinal cross-sectional view and an exploded, cross-sectional view of a main portion of a conventional pipe.
Figure 17:
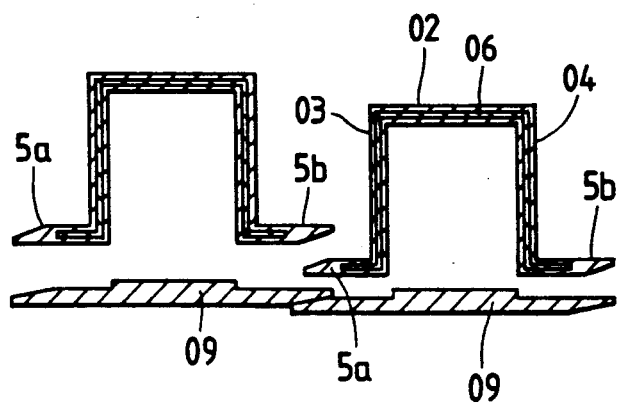

In an embodiment of the invention shown in FIG. 15, two kinds of metal belt plates 6 and 7 are abutted against each other at their side edges, and the inner and outer surfaces of the two metal belt plates 6 and 7 are covered at their abutted side edge portions with resin materials 11 and 12, respectively. Thus, in this case, the resin materials 11 and 12 serve as connective portions 3a and 4a interconnecting the two metal belt plates 6 and 7. In this embodiment, the inner surface of a bottom portions 6 of a pipe wall 1 is covered with a resin material 14, and the outer surface of a top portion 2 is covered with a resin material 15.

As to the material of the metal belt plates 6 and 7, in addition to a thin stainless steel plate or a steel plate, an iron plate may be used. Also, other metal may be used. When forming the above-mentioned punched holes, the shape, size and density of such holes can be suitably determined.

As to the synthetic resin materials forming the pipe wall and the connective portions, a polyolefin such as polyethylene, polypropylene or the like, and a vinyl chloride can be mainly used, but other synthetic resins may be used. Also, rubber or a rubber-type resin such as synthetic rubber may be used.

While the representative embodiments of the invention have been described herein, the invention itself is not to be restricted to such embodiments, and suitable modifications can be made so long as they have the essential features of the invention, achieve the object of the invention, and achieve the advantageous effects of the invention mentioned below.

As described above in detail with reference to the preferred embodiments, in the present invention, the wide thin metal belt plates are used as constituent elements for the pipe wall. These metal belt plates are suitably processed and deformed, and one of the metal belt plates continuously extends over the entire top portion of a helical corrugated shape and part of the opposite side wall portions extending from the top portion. The other metal belt plate continuously extends over the entire bottom portion and part of the opposite side wall portions extending from the bottom portion. In the helical corrugated pipe, the two metal belt plates, disposed respectively at the side of the top portion of the pipe wall and the side of the bottom portion, are arranged in such a manner that their opposite side edges are disposed in opposed relation. With this construction, the two metal belt plates will not be displaced away from each other in the direction of the thickness of the pipe wall, thus maintaining a stable posture. Therefore, even if the metal belt plates are considerably thin, the resultant pipe has a sufficient pressure-resistant strength withstanding a flattening force. Therefore, even when the metal belt plates are covered with the synthetic resin material over the entire inner and outer peripheral surfaces thereof, such covering synthetic resin layers can be considerably reduced in thickness. This achieves such advantages as the reduction of the overwall weight of the pipe, easier transport and handling of the pipe, and the reduction of the amount of the synthetic resin to be used. As to the manufacture, the metal belt plate which is rather difficult to be formed into a wound shape is divided into the two kinds of metal belt plates adapted to be disposed respectively on the side of the top portion of the pipe wall and the side of the bottom portion, and these two kinds of metal belt plates can be wound independently from each other when manufacturing the pipe. Therefore, the pipe can be easily manufactured. Moreover, the metal belt plates are hardly subjected to wrinkles, and therefore the pipe having a good appearance can be manufactured. Further, the thin metal belt plates can be made of a relatively thick plate. Further, the two kinds of metal belt plates can have different thicknesses and hardnesses, and also can be made respectively of different materials.

What is claimed is:

1. A pressure-resistant helical corrugated pipe, the pipe defining a longitudinal axis and comprising:
   a helical corrugated pipe wall having a top portion disposed remote with respect to the longitudinal axis of the pipe, a bottom portion disposed close to the longitudinal axis of the pipe, and opposite side wall portions extending from said top portion to said bottom portion; and
   belt plates formed separately from each other and made of a thin metal plate; wherein
   said belt plates are disposed respectively in said top portion and said bottom portion as constituent elements of said pipe wall for reinforcing said pipe wall;
   at least one of said metal belt plates being bent so that opposite edges of said two metal belt plates are disposed in abutted relation without overlap or in spaced opposed relation without overlap in said opposite side wall portions; and
   wherein said opposite side wall portions include synthetic resin or rubber connective portions at which said two metal belt plates are connected.

2. A pressure-resistant helical corrugated pipe according to claim 1, further comprising an inner pipe wall provided in said pipe wall.

3. A pressure-resistant helical corrugated pipe according to claim 1, wherein said two belt plates are completely covered with said synthetic resin or rubber.

4. A pressure-resistant helical corrugated pipe according to claim 1, wherein said two belt plates are subjected to a rust-preventing treatment and a part of said two belt plates is exposed at said helical corrugated pipe wall.

5. A pressure-resistant helical corrugated pipe according to claim 1, wherein said belt plates are made of a material selected from a group consisting of stainless steel, steel and iron.

6. A pressure-resistant helical corrugated pipe according to claim 1, wherein said synthetic resin is a material selected from a group consisting of a polyolefin and a vinyl chloride.

* * * * *